(12) United States Patent
Shen et al.

(10) Patent No.: US 9,037,719 B2
(45) Date of Patent: May 19, 2015

(54) HYPERVISOR LEVEL DISTRIBUTED LOAD-BALANCING

(75) Inventors: Jianjun Shen, Beijing (CN); Zhi Feng Xia, Beijing (CN); Mojiong Qiu, Beijing (CN); Shudong Zhou, Fremont, CA (US); Donghai Han, Beijing (CN)

(73) Assignee: VMware, Inc., Palo Alto, CA (US)

( * ) Notice: Subject to any disclaimer, the term of this patent is extended or adjusted under 35 U.S.C. 154(b) by 624 days.

(21) Appl. No.: 12/792,861

(22) Filed: Jun. 3, 2010

(65) Prior Publication Data

US 2011/0194563 A1    Aug. 11, 2011

(30) Foreign Application Priority Data

Feb. 11, 2010 (CN) .......................... 2010 1 0108968

(51) Int. Cl.
*G06F 15/173* (2006.01)
*G06F 9/455* (2006.01)
*H04L 29/08* (2006.01)

(52) U.S. Cl.
CPC .. *G06F 9/45558* (2013.01); *G06F 2009/45595* (2013.01); *G06F 2009/4557* (2013.01); *H04L 67/1002* (2013.01)

(58) Field of Classification Search
CPC ............ G06F 9/45533; G06F 9/45541; G06F 9/4555; G06F 9/45558; G06F 9/455

USPC .......................................................... 709/226
See application file for complete search history.

(56) References Cited

U.S. PATENT DOCUMENTS

| | | | |
|---|---|---|---|
| 2004/0205250 A1* | 10/2004 | Bain et al. | 709/249 |
| 2006/0130060 A1* | 6/2006 | Anderson et al. | 718/1 |
| 2008/0189700 A1* | 8/2008 | Schmidt et al. | 718/1 |
| 2008/0259797 A1* | 10/2008 | Gruper et al. | 370/235 |
| 2009/0106571 A1* | 4/2009 | Low et al. | 713/310 |
| 2010/0077395 A1* | 3/2010 | Edwards et al. | 718/1 |
| 2010/0107162 A1* | 4/2010 | Edwards et al. | 718/1 |
| 2011/0023114 A1* | 1/2011 | Diab et al. | 726/22 |

* cited by examiner

*Primary Examiner* — Esther B Henderson

(57) ABSTRACT

A method and an apparatus of hypervisor level distributed load-balancing are disclosed. In one aspect, a method includes determining a location to direct a packet. The method also includes distributing the packet to process the packet through a processor. The method also includes assigning the packet to a guest such that a distribution of the packet to the guest is based on an algorithm. The method further includes altering a first destination address of the packet to a second destination address. The second destination address may be based on a virtual network interface of the guest. The method further includes convincing the guest the packet is from a virtual switch based on the second destination address. In addition, the method includes adjusting the distribution of the packet to the guest. The method also includes reducing a load of the guest through the adjustment.

30 Claims, 3 Drawing Sheets

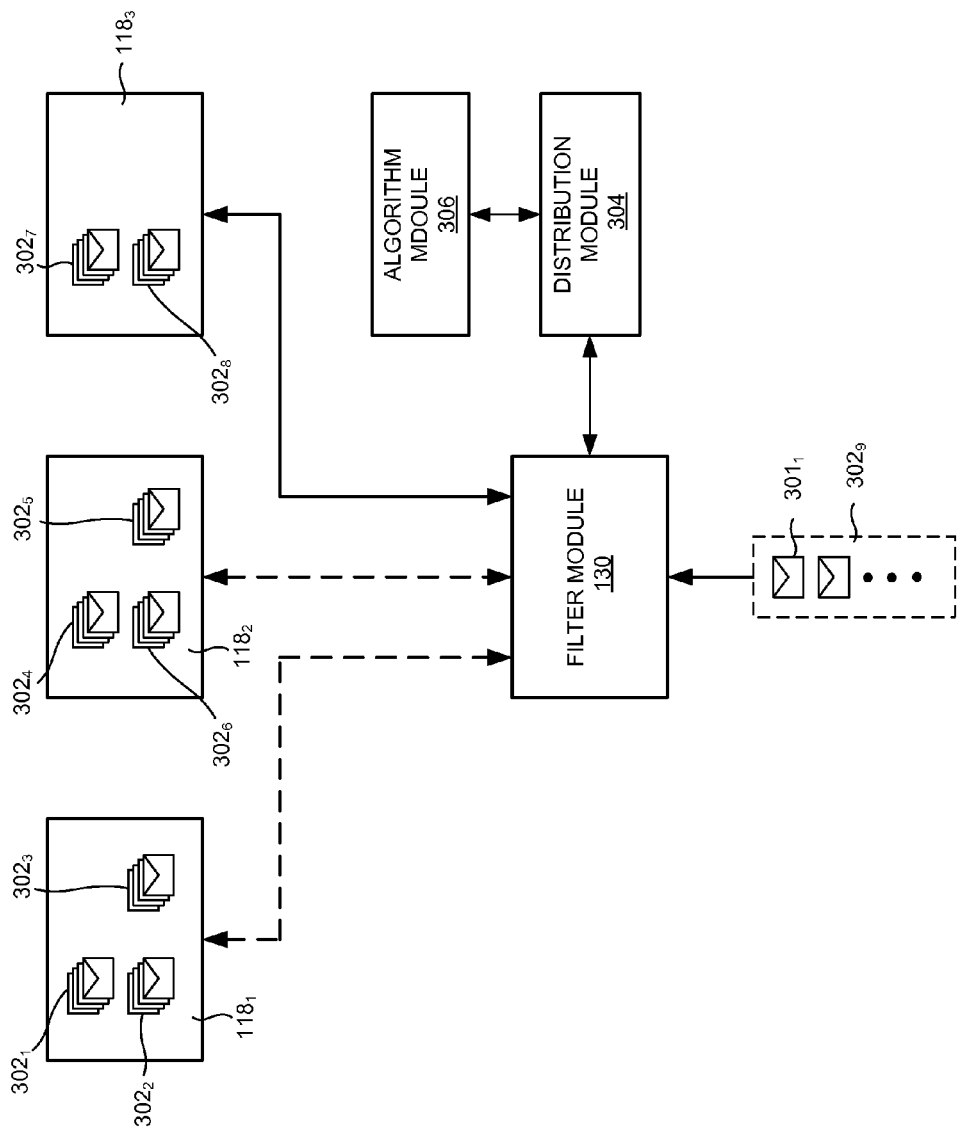

HYPERVISOR LEVEL DISTRIBUTED LOAD-BALANCING

CROSS REFERENCE TO RELATED APPLICATIONS

This Application claims foreign priority benefits under 35 U.S.C. 119 of Chinese Patent Application 201010108968.8, which was filed on Feb. 11, 2010.

FIELD OF TECHNOLOGY

This disclosure relates generally to the technical field of software and virtual machines and, in one embodiment, to a method, system and an apparatus of hypervisor level distributed load-balancing.

BACKGROUND

In computer networking, load balancing may be a technique to distribute workload evenly across two or more computers, network links, CPUs, hard drives, or other resources. Load balancing can help optimal resource utilization, maximize throughput, minimize response time, and/or avoid overload. Using multiple components with load balancing, (e.g., instead of a single component), can increase reliability through redundancy. The load balancing service may be provided by a dedicated program or hardware device (e.g., a multilayer switch, a DNS server). Load balancing may be implemented by physical hardware. The hardware implementation may be costly.

Distributed Load Balancing (DLB) may be a type of load balancing. Compared to a centralized load balancing solution, a DLB solution may not have a central load balancer, hence has no performance bottleneck and single point of failure. The DLB may be implemented at a guest operating system (OS) level in a virtualization environment. Implementing the DLB at the OS level may be inefficient because each inbound network packet may need to be delivered to every guest in a DLB cluster, and a load balancing decision for the packet may be made among all of the guests. In an environment with many guests, such a decision may be time and/or resource clogging, and it may limit the scalability of a DLB cluster. Additionally, the guest OS level implementation may not be transparent to the OS of the guests.

SUMMARY

A method and an apparatus of hypervisor level distributed load-balancing are disclosed. In one aspect, a method includes determining a location to direct a packet. The method also includes distributing the packet to process the packet through a processor. A packet (or network packet) may be a segment of data having associated envelope and/or metadata that includes a destination address of the segment of data. The method also includes assigning the packet to a guest such that a distribution of the packet to the guest is based on an algorithm. The method further includes altering a first destination MAC address of the packet to a second destination MAC address. The second destination address is based on a virtual network interface of the guest. The method further includes convincing the guest that the packet is intended for the guest. In addition, the method includes adjusting the distribution of the packet to the guest. The method also includes reducing a load of the guest through the adjustment. The method further includes directing the packet to the guest based on the distribution (e.g., decision) of the packet.

In another aspect, a method includes determining, on a processor, an apportionment of a packet based on an algorithm to reduce a load of a guest. The method also includes distributing the packet to the guest based on the apportionment. The method further includes modifying a first destination MAC address of the packet to a second destination MAC address. In addition, the method includes indicating to the guest that the packet is for the guest. The method further includes directing the packet with the second destination MAC address to the guest. The method may include modifying inbound ARP requests to the guests, or outbound ARP responses from the guests.

In another aspect, an apparatus includes a supervisor filter module to determine a distribution of packet based on an algorithm to reduce a load of a guest. The apparatus also includes a dispatching filter module to direct the packet to a guest and to modify a first destination MAC address of the packet to a second destination MAC address. In addition, the apparatus also includes a heartbeat module to adjust the distribution of the packet based on a second status (e.g., when the second status illustrates failure) of the second host to reduce the distribution of the packet to the second host and to increase the distribution of the packet to a first host (e.g., the first status of the first host is active).

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE VIEWS OF DRAWINGS

Example embodiments are illustrated by way of example and not a limitation in the figures of accompanying drawings, in which like references indicate similar elements and in which:

FIG. 3 is a system view illustrating a load balancing through using the filter module of the host, according to an example embodiment.

Other features of the present embodiments will be apparent from accompanying Drawings and from the Detailed Description that follows.

DETAILED DESCRIPTION

A method, system and an apparatus of hypervisor level distributed load-balancing is disclosed. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1:
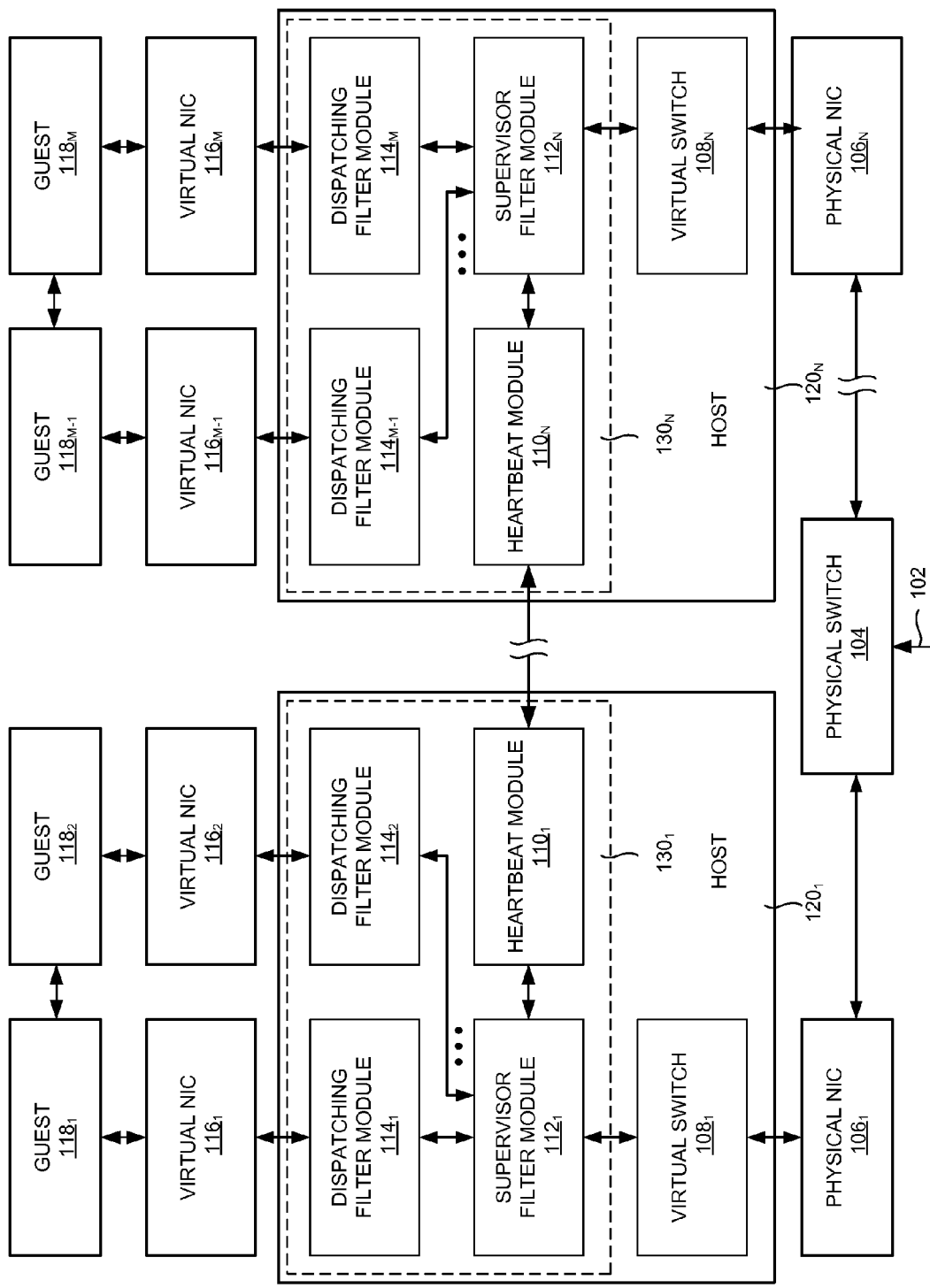
FIG. 1 is a system view illustrating implementation of Distributed Load Balancer (DLB) at a host (e.g., hypervisor level), according to one or more embodiments.

FIG. 1 is a system view illustrating an implementation of a Distribution Load Balancer (DLB) at a host level (e.g., hypervisor), according to one or more embodiments. Resource optimization techniques such as load balancing may enable the company to manage the process and to provide services efficiently. Load balancing may be a process of distributing a work load (e.g., service requests) among two or more network segments. The network segments may include, but are not limited to servers, virtual machines, computers, processors, and data storage devices.

According to one embodiment, the network segments described herein may refer to guest(s) $118_{1-M}$, which may process an incoming request 102 to provide a response based on the request. In one or more embodiments, the guest(s) $118_{1-M}$ described herein may refer to virtual machines in a virtualization environment. A DLB cluster may be composed of one or more guest(s) $118_{1-M}$. In one or more embodiments, the DLB cluster may be configured to have a virtual IP address (VIP) and a Virtual Media Access Control (VMAC) address, which are the destination IP and destination MAC address of incoming requests 102. In one or more embodiments, the DLB may be a classification of load balancing, which may not have a central load balancer.

Client device(s) may communicate the request (e.g., for service) to the guest $118_{1-M}$ using an IP address of the guest(s) $118_{1-M}$ from an external network. The incoming requests may be communicated by the client device(s) to a physical switch 104 from an external network. The physical switch 104 may receive the incoming requests 102 (e.g., for service) from the client devices for further processing. In one or more embodiments, the physical switch 104 may be hardware (e.g., layer 2 device) used for communicating packets between the network segments (e.g., through wires or wirelessly). The physical switch 104 may broadcast the incoming request(s) 102 (e.g., in the form of packets) to one or more physical network interfaces $106_{1-N}$ that are communicatively coupled to the physical switch 104. The reason as to why the physical switch 104 broadcasts the incoming request(s) is explained further below. The physical network interfaces $106_{1-N}$ may communicate the packets to a cluster (e.g., a group of guest(s) $118_{1-M}$) coupled to the physical network interfaces $106_{1-N}$. It should be noted that the subscripts M and N represents an integer.

In one or more embodiments, the physical network interface(s) $106_{1-N}$ may be a hardware device such as Network Interface Card (NIC) (e.g., layer 2 device) that enables communication between data processing devices such as computers, servers, or any other suitable device in a network. In one or more embodiments, the physical network interface(s) $106A_{1-N}$ may communicate the request 102 and the responses between the guest(s) $118_{1-M}$ and the physical switch 104. In one or more embodiments, the guest(s) $118_{1-M}$ may be a data processing system(s), for example servers that are configured as virtual machines. The guest(s) $118_{1-M}$ may include components such as processor, memory, etc. to process the information (e.g., service the requests).

Furthermore, in one or more embodiments, the communication between the physical network interface(s) $106A_{1-N}$ and the guests $118_{1-M}$ may be routed through a host(s) $120_{1-N}$. In one or more embodiments, the host(s) $120_{1-N}$ may be a hardware device supported by a software (e.g., platform-virtualization software, other supporting software and modules of the host(s) $120_{1-N}$) configured to manage the guests $118_{1-M}$ (e.g., virtual marriage). In addition, the host(s) $120_{1-N}$ may be configured to control all the communications between the physical network interface(s) $106A_{1-N}$ and the guest(s) $118_{1-M}$. The host(s) $120_{1-N}$ described herein may include a virtual switch(s) $108_{1-N}$, and a filter module $130_{1-N}$. In one or more embodiments, the host(s) $120_{1-N}$ may be a hypervisor (e.g., virtual machine monitor) configured to manage the guest(s) $118_{1-M}$ (e.g., virtual machines).

A load balancing algorithm and related software may be implemented in the host(s) $120_{1-N}$ for data distribution and load balancing. Accordingly, apportionment of packets, the load balancing and distribution of packets may be performed from the host(s) $120_{1-N}$. In one or more embodiments, the load balancing algorithm may be a load balancing program to determine a distribution of the packet based on a source internet protocol address, layer 4 information, and/or layer 7 information, etc. The load balancing algorithm coordinates and controls each of the host(s) $120_{1-N}$ for performing load balancing, thereby reducing the co-ordination and communication process between the host(s) $120_{1-N}$. Specifically, the load balancing algorithm implements a filter module(s) $130_{1-N}$ in the host(s) $120_{1-N}$ to coordinate and implement load balancing at the host $120_{1-N}$ level (e.g., hypervisor level). In one or more embodiments, the load balancing algorithm may reduce the communication process for coordination (e.g., negotiations) between the host(s) $120_{1-N}$. The host(s) $120_{1-N}$ described herein may support a wide variety of guest(s) $118_{1-M}$ (e.g., Unix®, Linux®, Windows®, etc.). In addition, the host(s) $120_{1-N}$ are capable of supporting different operating systems to run on the host(s) $120_{1-N}$ concurrently.

Specifically, the load balancing algorithm may implement the filter module $130_{1-N}$ in the host(s) $120_{1-N}$ (e.g., hypervisor, ESX®) for each of the cluster coupled to the virtual switch $108_{1-N}$. In one or more embodiments, one filter module $130_{1-N}$ may be implemented per virtual switch $108_{1-N}$ per cluster. In one or more embodiments, there may be more than one virtual switch per host. In one or more embodiments, one or more guests belonging to a cluster may be connected through the virtual switches $108_{1-N}$ of one or more host(s) $120_{1-N}$. Also, in one or more embodiments, a host may include one or more virtual switches $108_{1-N}$.

Furthermore, in one or more embodiments, when a first virtual network interface $116_{1-M}$ associated with the guest $118_{1-M}$ is communicatively coupled with the virtual switch $108_{1-N}$, the filter module $130_{1-N}$ generates an internal port whose MAC address may be the cluster's VMAC and communicatively couples a supervisor filter module $112_{1-N}$ of the filter module $130_{1-N}$ to the virtual switch $108_{1-N}$. In one or more embodiments, for each of the DLB cluster, there may be an internal port and a supervisor filter module on each of the virtual switch that communicatively couples one or more guests (e.g., virtual machines) belonging to the cluster. In one or more embodiments, the internal virtual switch ports of the cluster share the VMAC. Furthermore, any new additions of virtual network interfaces $116_{2-M}$ may be configured accordingly.

The filter module $130_{1-N}$ may then generate one or more dispatching filter modules $114_{1-M}$ for managing each of the guests $118_{1-M}$ when a virtual network interface $116_{1-M}$ belonging to a DLB cluster is communicatively coupled. The dispatching filter modules $114_{1-M}$ that are generated herein may be communicatively coupled to the supervisor filter modules $112_{1-N}$. The supervisor filter modules $112_{1-N}$ may control and/or coordinate the activities of the dispatching filter modules $114_{1-M}$ associated with the supervisor filter modules $112_{1-N}$ based on the load balancing algorithm. Furthermore, the dispatching filter module $114_{1-M}$ may be communicatively coupled to ports of the virtual switch $108_{1-N}$ and the virtual network interface $116_{1-M}$ associated with the guest $118_{1-M}$.

In one or more embodiments, the physical switch 104 may communicate the packets to the host $120_{1-N}$ in any of a unicast mode or in a multicast mode (e.g., through the physical network interface $106_{1-N}$). The host $120_{1-N}$ may further communicate the packets to the guest $118_{1-M}$ as will be explained further. The virtual switch $108_{1-N}$ of the host $120_{1-N}$ may receive the packets from the physical network interface $106_{1-N}$ to communicate the packets to the guest(s) $118_{1-M}$. In addition, the virtual switch $108_{1-N}$ of the host $120_{1-N}$ may forward the packets (e.g., inbound client requests) whose destination MAC address is VMAC to the internal port. In one or more embodiments, the supervisor filter module $112_{1-N}$ may intercept the packets to the internal port to perform load balancing based on the load balancing algorithm. In one or more embodiments, the load balancing algorithm configures the supervisor filter module $112_{1-N}$ in the cluster to accept or reject an incoming packet. In one or more embodiments, the load balancing algorithm determines a particular destination of the packet. For example, the load balancing algorithm may determine a particular guest of a particular DLB cluster to direct the packet. In one or more embodiments, the location or the target may be any one of the guest(s) $118_{1-M}$ (e.g., a target virtual machine). The packet (with VMAC to be the destination MAC) may be accepted by a designated supervisor filter (e.g., only one supervisor filter module $112_{1-N}$) and further directed to a designated guest (e.g., only one designated guest $118_{1-M}$).

Furthermore, the supervisor filter module $112_{1-N}$ based on the load balancing algorithm determines whether the packet should be accepted by any of the guest $118_{1-M}$ (e.g., through virtual network interface $116_{1-M}$) coupled to the virtual switch $108_{1-N}$. If the supervisor filter module $112_{1-N}$ determines that the packet has to be communicated to the guest $118_{1-M}$, then the supervisor filter module $112_{1-N}$ further determines to which guest(s) $118_{1-M}$ the packets should be communicated (e.g., through the virtual network interface $116_{1-M}$) based on the load balancing algorithm. In one or more embodiments, communications between hosts may not be required during the load balancing process. In one or more embodiments, the supervisor filter module $112_{1-N}$ on the virtual switch $108_{1-N}$ may take decisions independently for balancing the load.

Based on the load balancing algorithm, the supervisor filter module $112_{1-N}$ is configured to communicate (e.g., distribute) the packet to the specified guest $118_{1-M}$ (e.g., through the virtual network interface $116_{1-M}$). In one or more embodiments, the supervisor filter module $112_{1-N}$ may be configured by the load balancing algorithm to discard the copy of the packet which shall be accepted by another designated host $120_{1-N}$ for processing. In another embodiment, the supervisor filter module $112_{1-M}$ may configure the virtual switch $108_{1-N}$ to reject the packet if the packet has been already accepted for processing by another host of the cluster.

In one or more embodiments, the packets are assigned to the guest(s) $118_{1-M}$ based on the load balancing algorithm. In one or more embodiments, the supervisor filter module $112_{1-N}$ may respond to the Address Resolution Protocol (ARP) requests coming from the virtual switch $108_{1-N}$ for VIP, and the dispatching filter module $114_{1-M}$ may be configured to discard such ARP requests. In alternate embodiments, the supervisor filter module $112_{1-N}$ may be configured not to respond to the ARP requests; instead the guest(s) $118_{1-M}$ are configured to respond the ARP requests. However, in the case where the guest(s) $118_{1-M}$ are configured to respond, the dispatching filter module $114_{1-M}$ may be configured to intercept an outbound ARP response and modify the answered MAC address in the response to VMAC.

Furthermore, the load balancing algorithm managing each of the hosts $120_{1-N}$, ensures that a specific packet communicated for the particular the host $120_{1-N}$ shall be processed by a specific supervisor filter module $112_{1-N}$ of that particular host $120_{1-N}$ and remaining supervisor filter modules $112_{1-N}$ discard the packet. In one or more embodiments, the load balancing algorithm determines the specific supervisor filter module $112_{1-N}$ for processing the packet based on various parameters such as packet's source IP address, layer 4 information, and/or layer 7 information, etc. The load balancing algorithm of the hosts $120_{1-N}$ may determine a specific guest $118_{1-M}$ to process the packet.

Further, the supervisor filter module $112_{1-N}$ may resolve an IP address into a MAC address to enable communication of the packet to a specified guest $118_{1-M}$. In one or more embodiments, the IP address may be the cluster's VIP and the MAC address may be the cluster's VMAC (e.g., first destination address). The dispatching filter module $114_{1-M}$ of the filter module $130_{1-N}$ receives the packets from the virtual switch $108_{1-N}$ redirected by the supervisor filter module $112_{1-N}$. Furthermore, the dispatching filter module $114_{1-M}$ may modify the destination MAC address (e.g., VMAC or the address of the supervisor filter module port) to a second MAC address (e.g., the MAC address of the virtual network interface $116_{1-M}$). Further, the dispatching filter module $114_{1-M}$ of the filter module $130_{1-N}$ may communicate the packet to the designated to the guest $118_{1-M}$ (e.g., through the virtual network interface $116_{1-M}$) for further processing. Concurrently, the dispatching filter module $114_{1-M}$ may receive ARP requests from the virtual switch $108_{1-N}$. The dispatching filter module $114_{1-M}$, however, may discard the ARP requests as the supervisor filter module $112_{1-N}$ is configured to respond to the ARP requests so that the clients receive responses from the supervisor filter module $112_{1-N}$.

The guest $118_{1-M}$ may be convinced that the packet is for that guest. The packet having the second destination MAC address may be interpreted by the guest $118_{1-M}$ as the packet for that guest.

Furthermore, the guest(s) $118_{1-M}$ may generate responses (e.g., services) based on the request 102. The response packets may be communicated to the dispatching filter module $114_{1-M}$ though the virtual network interface $116_{1-M}$. The response packets may be collected by the dispatching filter module $114_{1-M}$ communicated back via the same route to the client.

In addition, a heartbeat module $110_{1-N}$ may be implemented in each of the filter module $130_{1-N}$. In one or more embodiments, the heartbeat module $110_{1-N}$ may monitor health (e.g., functional, idle, active, corrupt, etc.) of the other hosts $120_{1-N}$. In one or more embodiments, the heartbeat module $110_{1-N}$ may be implemented as a broadcast or multicast protocol. Alternatively, the heartbeat module $110_{1-N}$ may be implemented in a user space daemon (e.g., performs heartbeat using an Internet Protocol (IP) broadcast/multicast) or in the supervisor filter module $112_{1-N}$ (e.g. performs heartbeat using layer 2 broadcast/multicast), etc. In one or more embodiments, the heartbeat module $110_{1-N}$ implements a heartbeat protocol to communicate with the other heartbeat modules $110_{1-N}$ to determine a status (e.g., health) of the other hosts $120_{1-N}$ and to maintain a membership of the cluster across multiple hosts $120_{1-N}$. The heartbeat module $110_{1-N}$ may also be configured to monitor the health of the other hosts $120_{1-N}$ periodically and to communicate a heartbeat message accordingly.

In one or more embodiments, the DLB cluster may be composed of multiple guests $118_{1-M}$ in one host and/or across multiple hosts. The heartbeat module $110_{1-N}$ may communicate heartbeats (e.g., heartbeat messages) to other heartbeat modules $110_{1-N}$ on the other hosts $120_{1-N}$ to maintain a cluster membership. In one or more embodiments, when a guest joins (e.g., through virtual network interface communicatively coupled to a virtual switch) or leaves (e.g., with virtual network interface disconnected) the cluster, the heartbeat module $110_{1-N}$ on the host or the virtual switch $108_{1-N}$ notifies other heartbeat modules $110_{1-N}$ on the other hosts $120_{1-N}$ belonging to that cluster, and then the load balancing algorithm negotiates between the heartbeat modules $110_{1-N}$ on hosts $120_{1-N}$ to balance the load. In addition, the heartbeat module $110_{1-N}$ monitors the status of other hosts that belong to the same cluster. If any of the hosts $120_{1-N}$ fails, all the guest(s) associated with the failed host is removed from the cluster. In an embodiment, if the heartbeat module(s) $110_{1-N}$ detects a failure of a host in a cluster, then the load balancing algorithm removes the failed host from the distribution process and the negotiates with the other hosts $120_{1-N}$ to balance the load.

In one or more embodiments, the heartbeat module $110_{1-N}$ may monitor membership changes. Examples of membership changes may include: 1) a new guest joins; 2) a guest leaves; 3) a host fails so all the guests on the failed host are removed. The changes in the load distribution may be managed by the load balancing algorithm. Moreover, in one or more embodiments, the heartbeat module $110_{1-N}$ may monitor the health status of the guests (e.g., virtual machines and the network service provided by it) on its host, and if any of the guest fails, the failed guest may be removed from the cluster (e.g., as in normal guest leave) and notification may be provided for the other heartbeat modules in the cluster.

Furthermore, the heartbeat module $110_{1-N}$ may also be configured to detect inconsistency in the cluster (e.g., by maintaining a local view of the whole cluster to detect inconsistency with others in the cluster) and to solve the same by negotiations based on the load balancing algorithm. The heartbeat module $110_{1-N}$ may adjust the distribution of the packet based on a status of the host to reduce and/or increase the distribution of the packet to the host. In one or more embodiments, the heartbeat module $110_{1-N}$ may adjust the distribution of the packet to reduce (e.g., or stop) the distribution of the packet to the host, when the host shows a failed or busy status. Additionally, the heartbeat module $110_{1-N}$ may adjust the distribution of the packet to increase the distribution of the packet to another host, where the status of the other hosts is active and/or healthy. However, the increase and/or decrease in load distribution may be based on the load balancing algorithm to balance the distribution of the load.

In addition, the heartbeat module $110_{1-N}$ may also be configured to detect addition and/or removal (e.g., membership changes) of a resource (e.g., guests) to the existing cluster to negotiate with other heartbeat modules $110_{1-N}$ to share the workload or for reassignment of workload based on the load balancing algorithm. The heartbeat module $110_{1-N}$ may detect addition and/or removal of any guests and starts and/or stops of the related protocol accordingly. In one or more embodiments, the heartbeat module $110_{1-N}$ may be supported by the addition and/or removal protocols, negotiation protocol, heart beating protocol, and other protocols that may monitor the health of other hosts, in addition to facilitating the transfer and/or addition and/or removal of guests. In one or more embodiments, the heartbeat module $110_{1-N}$ may also be configured to monitor the health status (e.g., working condition) of each of the guest(s) $118_{1-M}$ associated with the respective hosts $120_{1-N}$ by communicating an electronic message to the other heartbeat modules of the other hosts $120_{1-N}$. The distribution of packets based on the load may be adjusted accordingly based on the number of healthy guests $118_{1-M}$ associated with the host(s) $120_{1-N}$.

In one or more embodiments, a guest(s) $118_{1-M}$ may need to be migrated from one host to another. Using live migration (e.g., VMotion™ from VMware, Inc.) a guest may be migrated between hosts without perceptible down time. In one situation the migration may include migrating to a destination host which has guests that belong to same cluster as the source guest. In another situation, the migration may include migrating to a destination host which does not have guests that belong to the same cluster. In a case migration where the destination host belongs to same cluster as the source host, the guest(s) $118_{1-M}$ along with its load balance states may be moved to destination host by recording the information of the guest(s) $118_{1-M}$ in the supervisor filter module $112_{1-N}$ of the destination host and assigning a new dispatching filter module to the migrated guest(s) $118_{1-M}$. Furthermore, the load balance states of the guest(s) $118_{1-M}$ may be restored on the destination host after connecting to the destination host. In a case of migration, where destination host does not have a guest that belongs to the cluster, a new supervisor filter module in the destination host may be generated, and a corresponding dispatching filter module is assigned to the migrating guest. In addition, the load balancing states of the guest(s) $118_{1-M}$ may be restored on the destination host. The information of the migrated guest may be cleared from the source supervisor filter module and the heartbeat modules $110_{1-N}$ may coordinate a load balancing process based on the load balancing algorithm using suitable protocols (e.g., checking status, sending heartbeat messages, and negotiating consistency). Also, the hosts may be configured to support the migration.

Furthermore, in one or more embodiments, the filter module $130_{1-N}$ may configure the hardware to communicate packets in a unicast mode or a multicast mode. In the unicast mode, the cluster's VMAC is a unicast MAC address. Since the guest(s) $118_{1-M}$ may have their own MAC addresses, the physical switch 104 may not learn VMAC from the outbound packets. Therefore, the physical switch 104 communicates the incoming requests 102 (whose destination MAC address is VMAC) to the hosts $120_{1-N}$ as described before. In one or more embodiments, in the unicast mode, if guests belonging to one cluster are on different hosts and the hosts are connected by the physical switch 104, then each supervisor filter module may be assigned a unique MAC address to use as the source MAC address of the ARP responses to differentiate with the MAC addresses of the other supervisor filter module in the cluster to avoid conflicts in a layer 2 switch.

In a multicast mode, the MAC (e.g., the cluster's VMAC) shared by the supervisor filter modules $112_{1-N}$ is a multicast MAC address. Therefore, the physical switch 104 may be configured to forward a client request to the hosts $120_{1-N}$. Furthermore, the filter module $130_{1-N}$ may assign VMAC to the internal port associated with the supervisor filter module $112_{1-N}$. In one or more embodiments, the VAMC may be shared by the whole DLB cluster.

Figure 2:
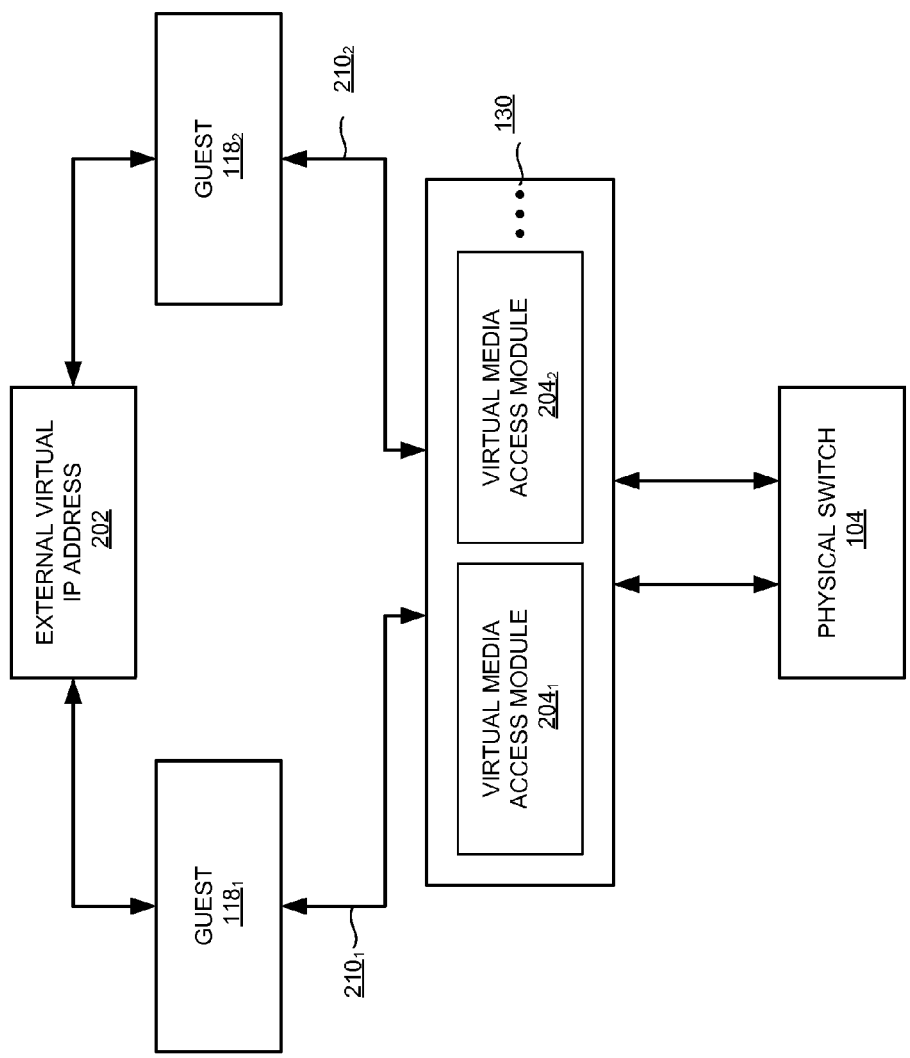
FIG. 2 is a system view illustrating a process of performing load distribution, according to one or more embodiments.

FIG. 2 is a system view illustrating a process of performing load distribution, according to one or more embodiments. The packets from client devices may be communicated to the hosts $120_{1-N}$ via the physical switch 104. In one or more embodiments, the packets may be communicated to the hosts $120_{1-N}$ in the cluster (e.g., broadcasting or multicasting). In one or more embodiments, the packets (e.g., incoming client requests) may be received by the hosts $120_{1-N}$ in the cluster that are destined for the guest(s) $118_{1-M}$ (e.g., using the VIP that is assigned to the cluster).

However, a particular host of the hosts $120_{1-N}$ may process (e.g., accept and communicates to the guest $118_{1-M}$) the packet selected by the load balancing algorithm. The filter module $130_{1-N}$ of the particular selected virtual switch $108_{1-N}$ may intercept the packet communicated to the internal port (e.g., packets communicated to VIP and ARP packets). Furthermore, the filter module $130_{1-N}$ may respond to ARP requests for the virtual IP address 202 with a virtual MAC address (e.g., the VIP is resolved to the VMAC rendering the virtual MAC address as the MAC address answer in a ARP response). Guest(s) $118_{1-M}$ of the same cluster may share an external virtual IP 202 to service the clients. Furthermore, the filter module $130_{1-N}$ may modify the destination MAC address of the packet from virtual MAC address to virtual network interface $116_{1-M}$ MAC address (e.g., a virtual media access control address $210_1$ and a virtual media access control address $210_2$).

In one or more embodiments, a virtual media access module $204_{1-M}$ (e.g., of the dispatching filter module) may perform the modification of the destination MAC address of the packet from a virtual MAC address to a virtual network interface $116_{1-M}$ MAC address. In an embodiment, there may be a virtual media access module $204_{1-M}$ for each guest $118_{1-M}$. Further, the virtual network interface $116_{1-M}$ communicates the packet that has the virtual network interface $116_{1-M}$ MAC address to the designated guest $118_{1-M}$. Further, the designated guest $118_{1-M}$ may process the request packet and generate the response packet. Furthermore, the designated guest $118_{1-M}$ may communicate the response packet to the virtual network interface $116_{1-M}$. Further, the virtual network interface $116_{1-M}$ may communicate the response to the filter module $130_{1-N}$. The response packet may be then communicated to the client devices through the physical switch 104 via the virtual switch 108 and the physical network interface 106 using the client MAC address.

FIG. 3 is a system view illustrating a load balancing through using the filter module of the host, according to an example embodiment. In particular, FIG. 3 illustrates the filter module 130 performing a process of load balancing controlled by a distribution module 304 based on the load balancing algorithm. FIG. 3 illustrates incoming requests $302_{1-N}$ (e.g., in form of packets) directed towards the filter module 130. The guests $118_{1-3}$ (e.g., virtual machines) are communicatively coupled to the filter module 130 (e.g., of the host) for processing the requests. The load balancing algorithm of an algorithm module 306 may manage the distribution module 304 to balance the work load or to distribute the incoming request in the form of packets $301_{1-N}$ to the guests $118_{1-M}$ such that the work load may be evenly distributed.

In an example embodiment, the figure illustrates the guest $118_1$ processing a request $302_1$ with two requests in queue $302_{2-3}$. Similarly, the figure illustrates the guest $118_2$ processing a request $302_4$ with two other requests in queue $302_{5-6}$. However, the guest $118_3$ is processing a request $302_7$, with only one request in queue $302_8$. The load balancing algorithm sensing the new incoming request $302_9$, may determine that the incoming request to be communicated to the guest $118_3$ to balance the load. The load balancing algorithm may communicate with the filter module 130 (e.g., through the distribution module 304) for communicating the request to the guest $118_3$. In one or more embodiments, the distribution module 304 may control the load balancing algorithm for communicating the requests or the load to a specific guest based on the load balancing algorithm. The algorithm module 306 may include a load balancing algorithm and other algorithms (e.g., algorithms to manage heartbeat module, etc.) for implementing load distribution at the host level.

The embodiments described herein may be integrated into the management model of virtual infrastructure to provide a unified management interface (e.g., vCenter™). Furthermore, the architecture may be combined with various other suitable management concepts. Furthermore, in the architecture described herein the cluster member guests (or virtual machines) can utilize different MAC addresses in the unicast mode, thereby enabling a configuration and deployment of guests.

In addition, the architecture described herein may support integration with virtualization technologies. The host level (hypervisor level) DLB may leverage and integrate with other virtualization technologies and solutions, like application health check, migration (e.g., VMotion®), High-Availability (HA) and Distributed Resource Scheduler (DRS).

In addition, the architecture described herein may enable the flow of packets such that only one guest (e.g., virtual machine) may receive and process a specific packet as compared to other architectures. In other words, one virtual machine in cluster may receive a packet for processing. Furthermore, the decision to communicate and process the packet through a specific virtual machine may be determined by the host.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed:

1. A method comprising:
   receiving a packet at a host coupled to a plurality of virtual machines, the plurality of virtual machines running on the host and being managed by a hypervisor of the host;
   assigning, at a level of the hypervisor of the host, the packet to a virtual machine in the plurality of virtual machines such that a distribution of the packet to the virtual machine is based on an algorithm, wherein the algorithm selects the virtual machine based on a load determined for virtual machines in the plurality of virtual machines;
   altering, at a level of the hypervisor of the host, a first destination address of the packet to a second destination address, wherein the second destination address is based on a virtual network interface of the virtual machine; and
   directing, at a level of the hypervisor of the host, the packet to the virtual machine based on the second destination address of the packet, wherein the virtual machine is a final destination of the packet.

2. The method of claim 1, further comprising:
   redirecting the packet, the packet being directed to a virtual internet protocol address; and
   responding to an address resolution protocol request of the virtual internet protocol address with a virtual media access control address.

3. The method of claim 2, wherein when the packet of a first filter module of the host accepts the packet, the packet is rejected by a second filter module of another host, the method further comprising:
   preventing the second filter module from accepting the packet through the rejection via application of the algorithm at the another host.

4. The method of claim 1, wherein, the algorithm is a distributed load balancing program to determine a distribution of the packet based on one of source internet protocol address, layer 4 information, and layer 7 information.

5. The method of claim 2, further comprising:
   rejecting the address resolution protocol request of a virtual switch to a dispatching filter module; and
   ensuring that an address resolution protocol response is issued from a supervisory filter module through the rejection.

6. The method of claim 1, wherein the host comprises a first host, the method further comprising:
reducing a conflict of a physical switch to use a first media access control address of the first host and a second media access control address of a second host when the physical switch receives a first address resolution protocol response of the first host and a second address resolution protocol response of the second host.

7. The method of claim 6, further comprising:
adjusting distribution of the packet based on a second status of the second host;
reducing the distribution of the packet to the second host through the adjustment, wherein the second status is at least one of failed and busy; and
increasing the distribution of the packet to the first host, wherein a first status of the first host is active.

8. The method of claim 7, further comprising:
migrating the virtual machine and a load balance state of the virtual machine to move the virtual machine from the first host to the second host.

9. The method of claim 8, further comprising:
reducing a negotiation between a first virtual machine and a second virtual machine, wherein the hypervisor allows a first operating system of the first virtual machine and a second operating system of the second virtual machine to run on the first host concurrently.

10. The method of claim 1, further comprising:
convincing the virtual machine the packet is for the virtual machine, wherein the packet of the second destination address is interpreted as the packet of the virtual network interface and the packet of the virtual network interface is interpreted as the packet for the virtual machine.

11. The method of claim 1, further comprising:
implementing a heartbeat module of the host;
communicating with the heartbeat module of the host and with another heartbeat module of another host to monitor a change in a membership status of the host and the another host in a cluster, wherein the change in the membership status of the host and the another host in the cluster is based on at least one of a virtual machine joining the host, a virtual machine leaving the host, and failure of the host;
monitoring a first health status of each of the virtual machines on its host and communicating a electronic message to the other heartbeat modules of other hosts in the cluster to adjust distribution of the packet among the hosts in the cluster; and
monitoring a health status of each of the hosts in the cluster through communicating a electronic message periodically between the heartbeat module of the host and the another heartbeat module of the another host in the cluster, wherein the health status of the host and the another host is determined based on the ability of the host and the another host to communicate and to respond to the electronic message.

12. A method comprising:
receiving a packet at a host associated with a set of virtual machines, the set of virtual machines running on the host and being managed by a hypervisor of the host;
determining, at a level of the hypervisor of the host, whether the packet should be processed by the host using a load balancing algorithm, the processing of the packet by the host comprising distributing the packet to one of the set of virtual machines, wherein the packet has been distributed to a plurality of hosts;
if the packet should be processed by the host, performing:
determining, at a level of the hypervisor of the host, a virtual machine in the plurality of virtual machines in which to send the packet;
modifying, at a level of the hypervisor of the host, a first destination address for the packet to a second destination address, wherein the second destination address is based on a virtual network interface of the virtual machine; and
sending, at a level of the hypervisor of the host, the packet to the virtual machine, wherein the virtual machine is a final destination of the packet.

13. The method of claim 12, wherein if the packet should not be processed by the host, the method further comprising:
discarding the packet, wherein another host in the plurality of hosts is configured to accept processing of the packet.

14. The method of claim 12, further comprising:
receiving an address resolution protocol (ARP) request at a supervisor filter module; and
responding to the ARP request at the supervisor filter module, wherein a dispatching filter module configured to send the packet to the virtual machine receives and discards the ARP request.

15. The method of claim 12, further comprising:
receiving, from the virtual machine, an ARP response to an ARP request, the ARP response including the second destination address; and
modifying the ARP response to include the first destination address instead of the second destination address.

16. The method of claim 12, further comprising:
receiving a heartbeat message from another host in the plurality of hosts, the heartbeat message representing a change in status of a host in the plurality of hosts; and
adjusting the load balancing algorithm based on the change in status.

17. The method of claim 16, wherein the change in status comprises a virtual machine joining a cluster including the plurality of hosts, a virtual machine leaving the cluster, and a host in the cluster failing.

18. The method of claim 16, wherein adjusting comprises adjusting the load balancing algorithm to distribute load differently among hosts in the plurality of hosts based on the change in status.

19. The method of claim 12, further comprising:
detecting a failure of a host in the plurality of hosts; and
adjusting the load balancing algorithm to remove the host from the load balancing algorithm and distributing load to other hosts in the plurality of hosts.

20. The method of claim 12, wherein the first destination address is addressed to a cluster including the set of virtual machines.

21. The method of claim 12, wherein if the packet should be processed by the host, the packet is rejected for processing by other hosts in the plurality of hosts.

22. The method of claim 12, wherein each host in the plurality of hosts uses the load balancing algorithm separately to determine if the packet should be processed.

23. The method of claim 22, wherein the host does not communicate with other hosts in the plurality of hosts to determine if the packet should be processed.

24. The method of claim 12, wherein determining the virtual machine comprises analyzing a load for each of the set of virtual machines to select the virtual machine.

25. The method of claim 12, wherein the load balancing algorithm is integrated with a high availability algorithm to distribute the packet when a failure of a host is detected.

26. A non-transitory computer-readable storage medium containing instructions, that when executed, control a computer system to be configured to:
  receive a packet at a host associated with a set of virtual machines, the set of virtual machines running on the host and being managed by a hypervisor of the host;
  determine, at a level of the hypervisor of the host, whether the packet should be processed by the host using a load balancing algorithm, the processing of the packet by the host comprising distributing the packet to one of the set of virtual machines, wherein the packet has been distributed to a plurality of hosts;
  if the packet should be processed by the host, the computer system operable to:
    determine, at a level of the hypervisor of the host, a virtual machine in the plurality of virtual machines in which to send the packet;
    modify, at a level of the hypervisor of the host, a first destination address for the packet to a second destination address, wherein the second destination address is based on a virtual network interface of the virtual machine; and
    send, at a level of the hypervisor of the host, the packet to the virtual machine, wherein the virtual machine is a final destination of the packet.

27. A system comprising:
  a plurality of hosts, wherein each host associated with a set of virtual machines, the set of virtual machines running on the host and being managed by a hypervisor of the host, wherein each host comprises:
  one or more computer processors; and
  a non-transitory computer-readable storage medium comprising instructions, that when executed, control the one or more computer processors to be configured to:
    receive a packet;
    determine, at a level of the hypervisor of the host, if the packet should be processed by the host to distribute the packet to one of the set of virtual machines using a load balancing algorithm, wherein the packet has been distributed to a plurality of hosts;
    if the packet should be processed by the host, the host is configured to:
      determine, at a level of the hypervisor of the host, a virtual machine in the set of virtual machines in which to send the packet;
      modify, at a level of the hypervisor of the host, a first destination address for the packet to a second destination address, wherein the second destination address is based on a virtual network interface of the virtual machine; and
      send, at a level of the hypervisor of the host, the packet to the virtual machine; and
    if the packet should not be processed by the host, the host is configured to reject the packet, wherein the packet is processed by a single host in the plurality of hosts.

28. The system of claim 27, wherein each host in the plurality of hosts uses the load balancing algorithm separately to determine if the packet should be processed.

29. The system of claim 27, further comprising a physical switch configured to send the packet to the plurality of hosts.

30. The system of claim 27, wherein each virtual machine in the set of virtual machines is associated with a virtual network interface, wherein the second destination address is determined from the virtual network interface associated with the virtual machine that is determined.

* * * * *